US012517775B2

(12) United States Patent
Dutta

(10) Patent No.: US 12,517,775 B2
(45) Date of Patent: Jan. 6, 2026

(54) PROCESSING UNIT FAULT DETECTION

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/628,362

(22) Filed: Apr. 5, 2024

(65) Prior Publication Data
US 2025/0315328 A1 Oct. 9, 2025

(51) Int. Cl.
*G06F 11/07* (2006.01)
*H04L 43/10* (2022.01)

(52) U.S. Cl.
CPC ...... *G06F 11/0757* (2013.01); *G06F 11/0724* (2013.01); *H04L 43/10* (2013.01)

(58) Field of Classification Search
CPC ............. G06F 11/0724; G06F 11/0757; G06F 11/0772; H04L 43/10; H04L 43/106
See application file for complete search history.

(56) References Cited

U.S. PATENT DOCUMENTS

| | | | | |
|---|---|---|---|---|
| 8,903,893 | B2 * | 12/2014 | Griffith | G06F 11/0763 |
| | | | | 709/203 |
| 9,304,734 | B2 * | 4/2016 | Ochi | H04L 43/10 |
| 10,459,782 | B2 * | 10/2019 | Baca | G06F 11/079 |
| 10,585,755 | B2 * | 3/2020 | Yamamoto | G06F 11/0724 |
| 2010/0284269 | A1 | 11/2010 | Zhu | |
| 2012/0089861 | A1 | 4/2012 | Cardinell et al. | |
| 2015/0033072 | A1 | 1/2015 | Barr et al. | |
| 2019/0155679 | A1 | 5/2019 | Kim et al. | |
| 2023/0087454 | A1 * | 3/2023 | Cheng | H04L 43/028 |
| | | | | 709/224 |
| 2023/0326265 | A1 * | 10/2023 | Law | G07C 5/008 |
| | | | | 701/33.4 |

OTHER PUBLICATIONS

Salfner, Felix, Peter Troger, and Steffen Tschirpke. "Cross-core event monitoring for processor failure prediction." In 2009 International Conference on High Performance Computing & Simulation, pp. 67-73. IEEE, 2009. (Year: 2009).*
Extended European Search Report, Application No. 25168380.1-1207, dated Sep. 11, 2025, 11 pages.

* cited by examiner

*Primary Examiner* — Joseph R Kudirka
(74) *Attorney, Agent, or Firm* — Tong, Rea, Bentley & Kim, LLC

(57) ABSTRACT

Various example embodiments of a processing unit fault detection capability are presented. The processing unit fault detection capability may be configured to support detection of faults in processor cores of a processing unit based on arrangement of the processor cores to form a data processing pipeline and monitoring of the processor cores of the data processing pipeline based on monitoring of the data processing pipeline (e.g., based on propagation of heartbeat messages via the data processing pipeline). The processing unit fault detection capability may be configured to support detection of faults in processor cores of various types of processing units, such as central processing units (CPUs), graphics processing units (GPUs), network processing units (NPUs), or the like.

23 Claims, 9 Drawing Sheets

PROCESSING UNIT FAULT DETECTION

TECHNICAL FIELD

Various example embodiments relate generally to computing systems and, more particularly but not exclusively, to fault detection in processing units of computing systems.

BACKGROUND

Computing systems utilize various types of processors to perform various functions in various contexts.

SUMMARY

In at least some example embodiments, an apparatus includes a processing unit including a plurality of processor cores, wherein the processing unit is configured to support arrangement of at least a portion of the processor cores into a data processing pipeline, wherein a first processor core of the set of processor cores, at a first location within the data processing pipeline, is configured to inject a heartbeat message into the data processing pipeline for propagation through the data processing pipeline, and wherein a second processor core of the set of processor cores, at a second location within the data processing pipeline, is configured to detect a fault associated with the data processing pipeline based on a determination that a threshold length of time passes without receipt of the heartbeat message at the second processor core via the data processing pipeline. In at least some example embodiments, the first processor core is configured to, based on a process configured to support periodic injection of heartbeat messages into the data processing pipeline, inject the heartbeat message into the data processing pipeline. In at least some example embodiments, the second processor core is configured to, based on the detection of the fault associated with the data processing pipeline, send a fault message toward a management entity of the processing unit. In at least some example embodiments, the first location is a first endpoint of the data processing pipeline, and the second location is a second endpoint of the data processing pipeline. In at least some example embodiments, the data processing pipeline is configured to support processing of data messages traversing the data processing pipeline. In at least some example embodiments, the heartbeat message is configured to be distinguished from the data messages. In at least some example embodiments, the data messages enter the data processing pipeline at the first processor core and exit the data processing pipeline at the second processor core. In at least some example embodiments, the data messages enter the data processing pipeline at the second processor core and exit the data processing pipeline at the first processor core. In at least some example embodiments, the data processing pipeline is configured to support processing of data packets traversing the data processing pipeline, and the heartbeat message is encoded as a data packet including a signature configured to enable the heartbeat message to be distinguished from the data packets traversing the data processing pipeline. In at least some example embodiments, the heartbeat message is based on a communication protocol, and at least one field in a communication protocol header of the communication protocol is set in a manner to indicate the heartbeat message. In at least some example embodiments, the heartbeat message includes at least one of an ethernet frame, a multiprotocol label switching packet, an internet protocol packet, or a bit index explicit replication packet. In at least some example embodiments, the heartbeat message includes an ethernet frame, and the ethernet frame is marked as being the heartbeat message using at least one header field of the ethernet frame. In at least some example embodiments, the heartbeat message includes an ethernet frame, and the ethernet frame is marked as being the heartbeat message based on inclusion within the ethernet frame of only a destination media access control address field, a source media access control address field, and an ethernet type/length field. In at least some example embodiments, each of the destination media access control address field, the source media access control address field, and the ethernet type/length field has a value of zero. In at least some example embodiments, the heartbeat message includes an ethernet frame, and the ethernet frame is marked as being the heartbeat message based on an ethernet type/length field including an ethernet type value defined to indicate that the ethernet frame is the heartbeat message. In at least some example embodiments, the heartbeat message includes an internet protocol packet, and the internet protocol packet is marked as being the heartbeat message using at least one header field of the internet protocol packet. In at least some example embodiments, the processing unit is configured to propagate the heartbeat message through the data processing pipeline based on storing of the heartbeat message in a memory accessible to the processor cores of the data processing pipeline and accessing of at least a portion of the heartbeat message from the memory by the processor cores of the data processing pipeline. In at least some example embodiments, the processing unit is configured to propagate the heartbeat message through the data processing pipeline based on passing of at least a portion of the heartbeat message along interconnections between adjacent ones of the processor cores of the data processing pipeline. In at least some example embodiments, the processing unit further includes a centralized monitoring entity configured to receive a fault message from the second processor core and initiate a management function for the data processing pipeline in response to the fault message. In at least some example embodiments, the management function includes at least one of shutting down the data processing pipeline or declaring a failure of the processing unit. In at least some example embodiments, the processing unit comprises a central processing unit, a graphics processing unit, or a network processing unit.

In at least some example embodiments, a non-transitory computer readable medium stores computer program instructions which, when executed by an apparatus, cause the apparatus to support, by a processing unit, operation of a set of processor cores of the processing unit as a data processing pipeline, inject, by a first processor core of the set of processor cores at a first location within the data processing pipeline, a heartbeat message into the data processing pipeline for propagation through the data processing pipeline, and detect, by a second processor core of the set of processor cores at a second location within the data processing pipeline based on a determination that a threshold length of time passes without receipt of the heartbeat message at the second processor core via the data processing pipeline, a fault associated with the data processing pipeline. In at least some example embodiments, the first processor core is configured to, based on a process configured to support periodic injection of heartbeat messages into the data processing pipeline, inject the heartbeat message into the data processing pipeline. In at least some example embodiments, the second processor core is configured to, based on the detection of the fault associated with the data processing pipeline, send a fault message toward a management entity of the processing unit. In at least some example embodiments, the first location is a first endpoint of the data processing pipeline, and the second location is a second endpoint of the data processing pipeline. In at least some example embodiments, the data processing pipeline is configured to support processing of data messages traversing the data processing pipeline. In at least some example embodiments, the heartbeat message is configured to be distinguished from the data messages. In at least some example embodiments, the data messages enter the data processing pipeline at the first processor core and exit the data processing pipeline at the second processor core. In at least some example embodiments, the data messages enter the data processing pipeline at the second processor core and exit the data processing pipeline at the first processor core. In at least some example embodiments, the data processing pipeline is configured to support processing of data packets traversing the data processing pipeline, and the heartbeat message is encoded as a data packet including a signature configured to enable the heartbeat message to be distinguished from the data packets traversing the data processing pipeline. In at least some example embodiments, the heartbeat message is based on a communication protocol, and at least one field in a communication protocol header of the communication protocol is set in a manner to indicate the heartbeat message. In at least some example embodiments, the heartbeat message includes at least one of an ethernet frame, a multiprotocol label switching packet, an internet protocol packet, or a bit index explicit replication packet. In at least some example embodiments, the heartbeat message includes an ethernet frame, and the ethernet frame is marked as being the heartbeat message using at least one header field of the ethernet frame. In at least some example embodiments, the heartbeat message includes an ethernet frame, and the ethernet frame is marked as being the heartbeat message based on inclusion within the ethernet frame of only a destination media access control address field, a source media access control address field, and an ethernet type/length field. In at least some example embodiments, each of the destination media access control address field, the source media access control address field, and the ethernet type/length field has a value of zero. In at least some example embodiments, the heartbeat message includes an ethernet frame, and the ethernet frame is marked as being the heartbeat message based on an ethernet type/length field including an ethernet type value defined to indicate that the ethernet frame is the heartbeat message. In at least some example embodiments, the heartbeat message includes an internet protocol packet, and the internet protocol packet is marked as being the heartbeat message using at least one header field of the internet protocol packet. In at least some example embodiments, the processing unit is configured to propagate the heartbeat message through the data processing pipeline based on storing of the heartbeat message in a memory accessible to the processor cores of the data processing pipeline and accessing of at least a portion of the heartbeat message from the memory by the processor cores of the data processing pipeline. In at least some example embodiments, the processing unit is configured to propagate the heartbeat message through the data processing pipeline based on passing of at least a portion of the heartbeat message along interconnections between adjacent ones of the processor cores of the data processing pipeline. In at least some example embodiments, the computer program instructions, when executed by the apparatus, cause the apparatus to receive, by a centralized monitoring entity from the second processor core a fault message and initiate a management function for the data processing pipeline in response to the fault message. In at least some example embodiments, the management function includes at least one of shutting down the data processing pipeline or declaring a failure of the processing unit. In at least some example embodiments, the processing unit comprises a central processing unit, a graphics processing unit, or a network processing unit.

In at least some example embodiments, a method includes supporting, by a processing unit, operation of a set of processor cores of the processing unit as a data processing pipeline, injecting, by a first processor core of the set of processor cores at a first location within the data processing pipeline, a heartbeat message into the data processing pipeline for propagation through the data processing pipeline, and detecting, by a second processor core of the set of processor cores at a second location within the data processing pipeline based on a determination that a threshold length of time passes without receipt of the heartbeat message at the second processor core via the data processing pipeline, a fault associated with the data processing pipeline. In at least some example embodiments, the first processor core is configured to, based on a process configured to support periodic injection of heartbeat messages into the data processing pipeline, inject the heartbeat message into the data processing pipeline. In at least some example embodiments, the second processor core is configured to, based on the detection of the fault associated with the data processing pipeline, send a fault message toward a management entity of the processing unit. In at least some example embodiments, the first location is a first endpoint of the data processing pipeline, and the second location is a second endpoint of the data processing pipeline. In at least some example embodiments, the data processing pipeline is configured to support processing of data messages traversing the data processing pipeline. In at least some example embodiments, the heartbeat message is configured to be distinguished from the data messages. In at least some example embodiments, the data messages enter the data processing pipeline at the first processor core and exit the data processing pipeline at the second processor core. In at least some example embodiments, the data messages enter the data processing pipeline at the second processor core and exit the data processing pipeline at the first processor core. In at least some example embodiments, the data processing pipeline is configured to support processing of data packets traversing the data processing pipeline, and the heartbeat message is encoded as a data packet including a signature configured to enable the heartbeat message to be distinguished from the data packets traversing the data processing pipeline. In at least some example embodiments, the heartbeat message is based on a communication protocol, and at least one field in a communication protocol header of the communication protocol is set in a manner to indicate the heartbeat message. In at least some example embodiments, the heartbeat message includes at least one of an ethernet frame, a multiprotocol label switching packet, an internet protocol packet, or a bit index explicit replication packet. In at least some example embodiments, the heartbeat message includes an ethernet frame, and the ethernet frame is marked as being the heartbeat message using at least one header field of the ethernet frame. In at least some example embodiments, the heartbeat message includes an ethernet frame, and the ethernet frame is marked as being the heartbeat message based on inclusion within the ethernet frame of only a destination media access control address field, a source media access control address field, and an ethernet type/length field. In at least some example embodiments, each of the destination media access control address field, the source media access control address field, and the ethernet type/length field has a value of zero. In at least some example embodiments, the heartbeat message includes an ethernet frame, and the ethernet frame is marked as being the heartbeat message based on an ethernet type/length field including an ethernet type value defined to indicate that the ethernet frame is the heartbeat message. In at least some example embodiments, the heartbeat message includes an internet protocol packet, and the internet protocol packet is marked as being the heartbeat message using at least one header field of the internet protocol packet. In at least some example embodiments, the processing unit is configured to propagate the heartbeat message through the data processing pipeline based on storing of the heartbeat message in a memory accessible to the processor cores of the data processing pipeline and accessing of at least a portion of the heartbeat message from the memory by the processor cores of the data processing pipeline. In at least some example embodiments, the processing unit is configured to propagate the heartbeat message through the data processing pipeline based on passing of at least a portion of the heartbeat message along interconnections between adjacent ones of the processor cores of the data processing pipeline. In at least some example embodiments, the method includes receiving, by a centralized monitoring entity from the second processor core a fault message and initiating a management function for the data processing pipeline in response to the fault message. In at least some example embodiments, the management function includes at least one of shutting down the data processing pipeline or declaring a failure of the processing unit. In at least some example embodiments, the processing unit comprises a central processing unit, a graphics processing unit, or a network processing unit.

In at least some example embodiments, an apparatus includes means for supporting, by a processing unit, operation of a set of processor cores of the processing unit as a data processing pipeline, means for injecting, by a first processor core of the set of processor cores at a first location within the data processing pipeline, a heartbeat message into the data processing pipeline for propagation through the data processing pipeline, and means for detecting, by a second processor core of the set of processor cores at a second location within the data processing pipeline based on a determination that a threshold length of time passes without receipt of the heartbeat message at the second processor core via the data processing pipeline, a fault associated with the data processing pipeline. In at least some example embodiments, the first processor core is configured to, based on a process configured to support periodic injection of heartbeat messages into the data processing pipeline, inject the heartbeat message into the data processing pipeline. In at least some example embodiments, the second processor core is configured to, based on the detection of the fault associated with the data processing pipeline, send a fault message toward a management entity of the processing unit. In at least some example embodiments, the first location is a first endpoint of the data processing pipeline, and the second location is a second endpoint of the data processing pipeline. In at least some example embodiments, the data processing pipeline is configured to support processing of data messages traversing the data processing pipeline. In at least some example embodiments, the heartbeat message is configured to be distinguished from the data messages. In at least some example embodiments, the data messages enter the data processing pipeline at the first processor core and exit the data processing pipeline at the second processor core. In at least some example embodiments, the data messages enter the data processing pipeline at the second processor core and exit the data processing pipeline at the first processor core. In at least some example embodiments, the data processing pipeline is configured to support processing of data packets traversing the data processing pipeline, and the heartbeat message is encoded as a data packet including a signature configured to enable the heartbeat message to be distinguished from the data packets traversing the data processing pipeline. In at least some example embodiments, the heartbeat message is based on a communication protocol, and at least one field in a communication protocol header of the communication protocol is set in a manner to indicate the heartbeat message. In at least some example embodiments, the heartbeat message includes at least one of an ethernet frame, a multiprotocol label switching packet, an internet protocol packet, or a bit index explicit replication packet. In at least some example embodiments, the heartbeat message includes an ethernet frame, and the ethernet frame is marked as being the heartbeat message using at least one header field of the ethernet frame. In at least some example embodiments, the heartbeat message includes an ethernet frame, and the ethernet frame is marked as being the heartbeat message based on inclusion within the ethernet frame of only a destination media access control address field, a source media access control address field, and an ethernet type/length field. In at least some example embodiments, each of the destination media access control address field, the source media access control address field, and the ethernet type/length field has a value of zero. In at least some example embodiments, the heartbeat message includes an ethernet frame, and the ethernet frame is marked as being the heartbeat message based on an ethernet type/length field including an ethernet type value defined to indicate that the ethernet frame is the heartbeat message. In at least some example embodiments, the heartbeat message includes an internet protocol packet, and the internet protocol packet is marked as being the heartbeat message using at least one header field of the internet protocol packet. In at least some example embodiments, the processing unit is configured to propagate the heartbeat message through the data processing pipeline based on storing of the heartbeat message in a memory accessible to the processor cores of the data processing pipeline and accessing of at least a portion of the heartbeat message from the memory by the processor cores of the data processing pipeline. In at least some example embodiments, the processing unit is configured to propagate the heartbeat message through the data processing pipeline based on passing of at least a portion of the heartbeat message along interconnections between adjacent ones of the processor cores of the data processing pipeline. In at least some example embodiments, the method includes receiving, by a centralized monitoring entity from the second processor core a fault message and initiating a management function for the data processing pipeline in response to the fault message. In at least some example embodiments, the management function includes at least one of shutting down the data processing pipeline or declaring a failure of the processing unit. In at least some example embodiments, the processing unit comprises a central processing unit, a graphics processing unit, or a network processing unit.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments of a processing unit fault detection capability are presented. The processing unit fault detection capability may be configured to support detection of faults in a processing unit including a set of processor cores. The processing unit fault detection capability may be configured to support detection of faults in processor cores of a processing unit based on arrangement of the processor cores to form a data processing pipeline and monitoring of the processor cores of the data processing pipeline based on monitoring of the data processing pipeline. The processing unit fault detection capability may be configured to support detection of faults in processor cores of a processing unit that are arranged to form a data processing pipeline based on propagation of heartbeat messages via the data processing pipeline (e.g., injection of heartbeat messages by a processor core at a first location within the data processing pipeline and detection of heartbeat messages by a processor core at a second location within the data processing pipeline, such as at the endpoint processor cores of the data processing pipeline). The processing unit fault detection capability may be configured to support detection of faults in processor cores of a processing unit by supporting, by a processing unit, operation of a set of processor cores of the processing unit as a data processing pipeline, injecting, by a first processor core of the set of processor cores at a first location within the data processing pipeline, a heartbeat message into the data processing pipeline for propagation through the data processing pipeline, and detecting, by a second processor core of the set of processor cores at a second location within the data processing pipeline based on a determination that a threshold length of time passes without receipt of the heartbeat message at the second processor core via the data processing pipeline, a fault associated with the data processing pipeline. The processing unit fault detection capability may be configured to support detection of faults in processor cores of various types of processing units, such as central processing units (CPUs), graphics processing units (GPUs), network processing units (NPUs), or the like. It will be appreciated that these and various other example embodiments of the processing unit fault detection capability may be further understood by way of reference to the various figures, which are discussed further below.

Figure 1:
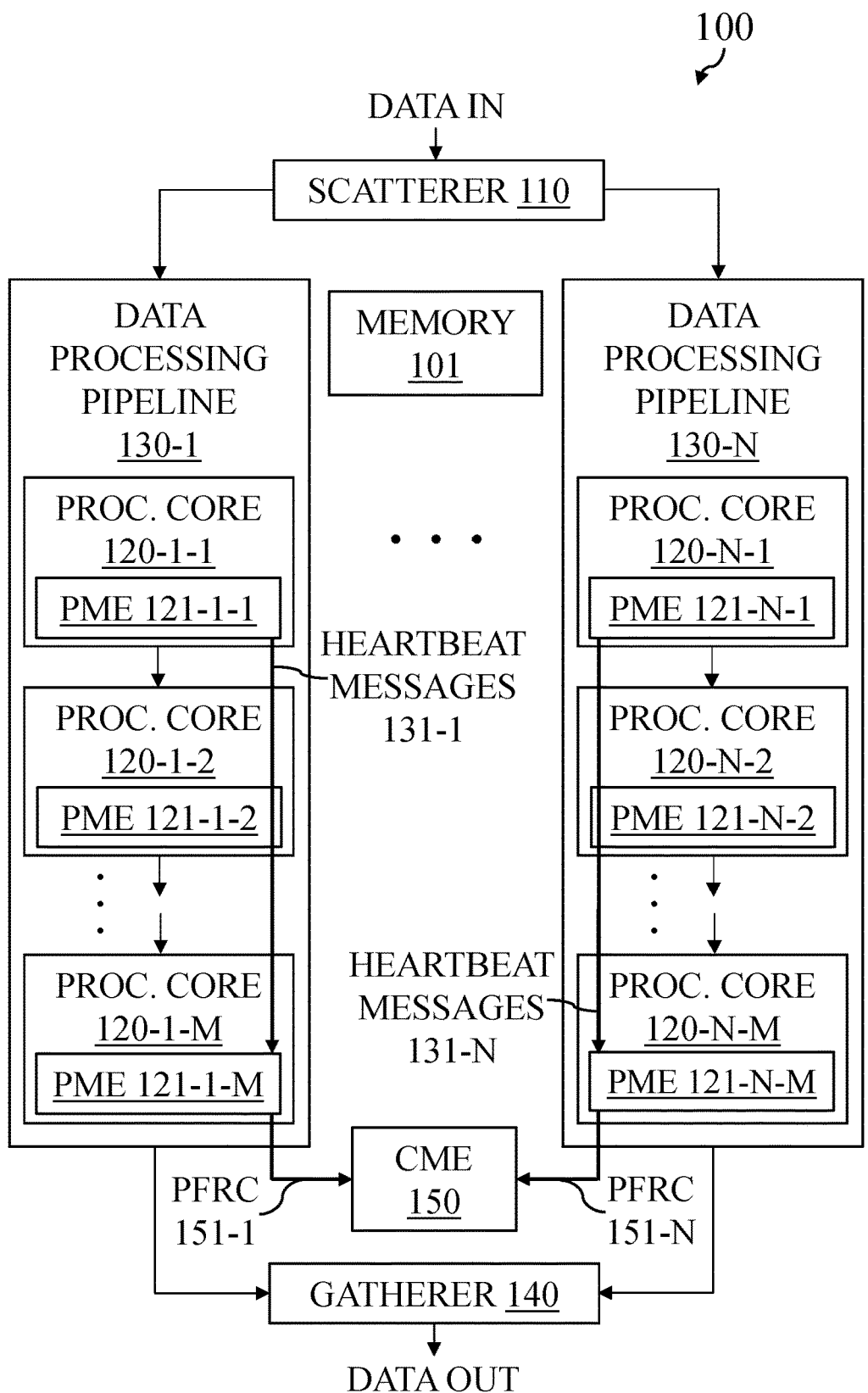
FIG. 1 depicts an example embodiment of a processing unit including a set of processor cores where the processing unit is configured to support fault detection for the processor cores of the processing unit.

FIG. 1 depicts an example embodiment of a processing unit including a set of processor cores where the processing unit is configured to support fault detection for the processor cores of the processing unit.

The processing unit 100 may be any multi-core processing unit configured to support operation of the processor cores in data processing pipelines. For example, the processing unit 100 may be a central processing unit (CPU), a graphics processing unit (GPU), a network processing unit (NPU), or the like. The processing unit 100 may be configured to be disposed within various types of host devices to support various applications. For example, the processing unit 100 may be configured to be disposed within a computer, a smartphone, a router, a switch, a server, a medical device, a supercomputer, or the like. For example, the processing unit 100 may be configured to support various types of applications which may be supported based on general computing functions for use within various types of computing devices and/or specific computing functions for use within various types of computing devices (e.g., video rendering, video editing, extended reality, high speed network communications, medical imagery, cryptocurrency mining, or any other applications in which a processing unit may be employed to perform various types of processing functions). The processing unit 100 may include various numbers of processor cores which may be arranged to support parallel processing functions (e.g., 1000 processor cores, 2000 processor cores, 4000 processor cores, 8000 processor cores, 64,000 processor cores, and so forth). It will be appreciated that the processing unit 100 may be implemented within various other types of devices, may be utilized to support various other types of applications, or the like, as well as various combinations thereof.

The processing unit 100 includes a memory 101, a scatterer 110, a set of processor cores 120-1-120-X (collectively, processor cores 120) including a set of pipeline monitoring entities (PMEs) 121-1-121-X (collectively, PMEs 121) and arranged to form a set of data processing pipelines 130-1-130-N (collectively, data processing pipelines 130), a gatherer 140, and a centralized monitoring entity (CME) 150. The memory 101 is configured to store various types of information for enabling the processor cores 120 of the data processing pipelines 130 to process data (e.g., program instructions for performing data processing, data to be processed, reference data used to support processing of data to be processed, and so forth). As illustrated in FIG. 1, data entering the processing unit 100 (denoted as DATA IN) is received at the scatterer 110, the scatterer 110 distributes the data to the data processing pipelines 130, the data is processed by the processor cores 120 as the data propagates through the data processing pipelines 130, the data processing pipelines 130 output the processed data to the gatherer 140, and the processed data output by the gatherer 140 leaves the processing unit 100 (denoted as DATA OUT). It will be appreciated that, although omitted for purposes of clarity, each of the data processing pipelines 130 may have an ingress queue and egress queue associated therewith (e.g., an ingress queue arranged between the output of the scatterer 110 that goes to the data processing pipelines 130 for queuing data before it enters the data processing pipelines 130 and an egress queue arranged between the output of the data processing pipelines 130 and the input to the gatherer 140 for queuing data after it leaves the data processing pipelines 130). The pipeline monitoring entities 121 and the centralized monitoring entity 150, as discussed further herein, are configured to cooperate to support various aspects of various example embodiments of the processing unit fault detection capability. It will be appreciated that the processing unit 100 may include various other elements configured to support processing of data and to support various aspects of various example embodiments of the processing unit fault detection capability.

The processor cores 120 are arranged to form the data processing pipelines 130 such that each of the N data processing pipelines 130 includes M of the processor cores 120, i.e., a two-dimensional N×M array where N×M=X). For example, as illustrated in FIG. 1, the processor cores 120 may be arranged such that data processing pipeline 130-1 includes M processor cores 120-1-1-120-1-M (which may be referred to collectively as processor cores 120-1 of data processing pipeline 130-1), data processing pipeline 130-2 includes M processor cores 120-2-1-120-2-M (which may be referred to collectively as processor cores 120-2 of data processing pipeline 130-2), and so forth, with data processing pipeline 130-N including M processor cores 120-N-1-120-N-M (which may be referred to collectively as processor cores 120-N of data processing pipeline 130-N). For example, as illustrated in FIG. 1, the processor cores 120 also may be referenced by "processing stages" in terms of where the processor cores 120 reside in the data processing pipelines 130, with the first processing stage of the data processing pipelines 130 including the processor cores 120-1-1-120-N-1 (which may be referred to collectively as the first stage of processor cores 120-$x$-1), the second processing stage of the data processing pipelines 130 including the processor cores 120-1-2-120-N-2 (which may be referred to collectively as the second stage of processor cores 120-$x$-2), and so forth, with the M-th processing stage of the data processing pipelines 130 including the processor cores 120-1-M-120-N-M (which may be referred to collectively as the M-th stage of processor cores 120-$x$-M).

The data processing pipelines 130 are configured to process data in parallel such that the same set of processing functions may be applied to each of the data messages traversing the data processing pipelines 130. The data processing pipelines 130 may be configured such that each of the data processing pipelines 130 performs the same set of processing functions for data messages that traverse the data processing pipelines 130 (e.g., irrespective of the data processing pipeline 130 to which a given data message is directed, the data message will undergo the same processing as it traverses the processor cores 120 of the stages of processor cores 120 of the data processing pipeline 130). The data processing pipelines 130 may be configured to perform the same set of processing functions for the data messages that traverse the data processing pipelines 130 based on configuration of the processing cores 120 such that the stages of processor cores 120 perform subsets of the set of processing functions supported by the data processing pipelines 130, respectively. The data processing pipelines 130 may be configured to perform the same set of processing functions for the data messages that traverse the data processing pipelines 130 based on configuration of each of the stages of processor cores 120 such that, for a given stage of processor cores 120, each processor core 120 in the given stage of processor cores 120 performs the same set of processing functions (e.g., processor cores 120-1-1-120-N-1 in the first stage of processor cores 120-$x$-1 each perform a first set of processing functions, processor cores 120-1-2-120-N-2 in the second stage of processor cores 120-$x$-2 each perform a second set of processing functions, and so forth. In this manner, data messages may be distributed to any of the data processing pipelines 130 for processing within the processing unit 100.

The data processing pipelines 130 may be configured to process data in parallel based on parallel propagation of data messages through the data processing pipelines 130 in processing intervals. It will be appreciated that, while each processor core 120 in a particular stage of processor cores 120 across the data processing pipelines 130 may be equipped with the same set of processing functions, those processor cores 120 across the data processing pipelines 130 do not necessarily work in tandem and, thus, that the term "processing interval" is internal to any given data processing pipeline 130 (e.g., applies to a particular stage in a particular data processing pipeline 130). For example, assume that stage x (core x) in pipeline 1 is processing packet A and stage x (core x) in pipeline 2 is processing packet B. The nature of packet A and packet B is different (e.g., the packets are based on different Internet Protocol (IP versions, such as IPv4 vs IPv6), so stage x in each pipeline will execute a different control path in its program and, as a result, the processing time of packet A by stage x in pipeline 1 would be expected to be different than the processing time of packet B by stage x in pipeline 2. Here, in each pipeline, the stage x would process the packet independently of the other pipeline and pass on the packet to stage (x+1) as soon as it is done, such that the packets are not necessarily passed from stage x to stage (x+1) at the same time. Accordingly, it will be appreciated that references to packet processing intervals between the data processing pipelines 130 may refer to processing intervals that are decoupled from each other in time.

The data processing pipelines 130 may be configured to process data in parallel based on parallel propagation of data messages through the data processing pipelines 130 in processing intervals. The data messages enter the data processing pipelines 130 at the first stage of processor cores 120-$x$-1, proceed through the data processing pipelines 130 core-by-core in the processing intervals while undergoing processing at each stage of processor cores 120 in the processing intervals, and exit the data processing pipelines 130 at the M-th stage of processor cores 120-$x$-M. For any given data processing pipeline 130-$x$, during a processing interval, data messages may be processed in the current stages of processor cores 120 and then propagated to the next stages of processor cores 120 for processing in the next processing interval or data messages may be moved into the current stages of processor cores 120 after processing in previous stages of processor cores 120 in a previous interval and then processed in the current stages of processor cores 120. For any given data processing pipeline 130-$x$, in each processing interval, an existing set of data messages for which processing completed is moved out of the data processing pipeline 130-$x$ from the M-th stage of processor cores 120-$x$-M and a new set of data messages for which processing will begin is moved into the data processing pipeline 130-$x$ at the first stage of processing cores 120-$x$-1. In this manner, the processing intervals ensure that the data messages are propagated through the data processing pipelines 130 for processing at the stages of processor cores 120 of the data processing pipelines 130.

The data processing pipelines 130 may be configured to propagate data messages via the data processing pipelines 130 in various ways. It will be appreciated that the manner in which the data processing pipelines 130 propagate the data messages through the data processing pipelines 130 for processing may depend on the context within which processing is performed and, thus, on the format of the data messages. For example, where the processing unit is a network processing unit configured to support processing of data packets composed of packet headers and packet payloads, the packets may be stored in the memory 101 at memory locations indexed by memory addresses and the memory addresses may be passed from processor core 120 to processor core 120 along the data processing pipelines 130, the packet payloads may be stored in the memory 101 and the packet headers may be passed from processor core 120 to processor core 120 along the data processing pipelines 130, the full data packets themselves may be passed from processor core 120 to processor core 120 along the data processing pipelines 130, or the like. More generally, the data messages may be stored in the memory 101 at memory locations indexed by memory addresses and the memory addresses may be passed from processor core 120 to processor core 120 along the data processing pipelines 130, the data messages themselves may be passed from processor core 120 to processor core 120 along the data processing pipelines 130, or the like. Accordingly, it will be appreciated that propagation of data messages through the data processing pipelines 130 may be considered to be passing of the data messages themselves, passing portions of the data messages themselves, passing of processing control over processing of the data messages, or the like, as well as various combinations thereof.

The data processing pipelines 130 may be configured to process data messages based on a program (referred to here as program X). For example, each data processing pipeline 130 may pick up the data message at the head of its input packet queue (omitted for purposes of clarity), execute program X to process the data packet, and then send out the data message (e.g., the data message or a modified version of the data message) after processing is completed. Here, the program X also may be referred to as micro-code. In each of the data processing pipelines 130, a processor core 120 of the data processing pipeline 130 executes a portion (or segment) of the instructions of the program X, i.e., a stage of the data processing pipeline 130. For example, assume that program X is segmented into M sets of program segments (denoted as X1, X2, . . . , XM) corresponding to the M processor cores 120 of each of the data processing pipelines 130. It is expected that each of the processor cores 120 has a built-in instruction cache (IC) in which its assigned program segment is stored (where such ICs have been omitted for purposes of clarity). For example, in a given data processing pipeline 130, the first processor core 120 stores a copy of X1, the second processor core 120 stores a copy of X2, and so forth, with the M-th processor core 120 storing a copy of XM. With this arrangement, there is no contention among the processor cores 120 in accessing and executing the program segments for processing data. Additionally, when a processor core 120 performs its processing functions based on its program segment, it may need to perform one or more lookups to access reference data used for performing such processing functions. It is expected that such reference data may be stored in M external memory banks where there is a 1:1 mapping of processing stages of the data processing pipelines 130 to the M external memory banks (e.g., external memory bank 1 supports the processor cores 120-1-1-120-N-1 in the first stage of processor cores 120-$x$-1, external memory bank 2 supports the processor cores 120-1-2-120-N-2 in the second stage of processor cores 120-$x$-2, and so forth, with the M-th external memory bank supporting the processor cores 120-1-M-120-N-M in the M-th stage of processor cores 120-$x$-M). It is noted that the memory banks may be represented by the memory 101. With this arrangement, since each of the stages of processor cores 120 may be assigned a dedicated memory bank, there is no contention that otherwise might occur if a given memory bank was accessed from multiple stages of the data processing pipelines 130; however, since each of the processor cores 120 of a given stage of processor cores 120 accesses the same memory bank, there could be contention between the processor cores 120 of a given stage of processor cores 120 to the same memory bank. In order to avoid this access contention, each of the stages of processor cores 120 may be configured such that each processor core 120 in the stage of processor cores 120 has an independent memory bus to the memory bank (e.g., each of the memory banks provides N number of access buses or "ports" and, accordingly, such memory banks may be considered to be "multi-ported" memory banks). With the arrangement of the memory 101 using memory banks configured as discussed above, each processor core 120 in each of the data processing pipelines 130 may be able execute its program segment in a completely contention free manner. It will be appreciated, however, that if the number N of data processing pipelines 130 is very large then it may not be possible to have dedicated memory buses to the memory bank for each of the data processing pipelines 130, in which case, for each of the stages of processor cores 120, there may be a hierarchy of memory caches between the processor cores 120 of the stage of processor cores 120 and the memory bank dedicated for the stage of processor cores 120 (e.g., the caches of the cache hierarchy may exploit the temporal locality of frequently accessed data from the memory bank, such as where a processor core 120 at a stage first looks up the required data in its nearest cache in the cache hierarchy and, if the data is not found, then proceeds to look up the required data in the next cache(s) in the cache hierarchy until the data is found or the memory bank is accessed if the data is not found along the entire cache hierarchy).

The data processing pipelines 130 as discussed above may be further understood by considering a case in which the processing unit 100 is a network processing unit configured for processing packets. This is described within the context of the example above in which each of the data processing pipelines 130 is configured to perform packet processing on the packets using a program referred to as program X. For example, in a given data processing pipeline 130-$x$, the first processor core 120-$x$-1 of the data processing pipeline 130-$x$ picks up a first packet (denoted as packet Px1, where the "x" indicates the data processing pipeline and the "1" indicates the packet number) from the head of the input packet queue associated with the data processing pipeline 130-$x$ and executes the program segment X1 to process the first packet Px1. The first processor core 120-$x$-1 of the data processing pipeline 130-$x$, after processing the first packet Px1, passes the first packet Px1 to the second processor core 120-$x$-2 of the data processing pipeline 130-$x$. The first processor core 120-$x$-1 of the data processing pipeline 130-$x$ then picks up the next packet (denoted as packet Px2) from the head of the input packet queue associated with the data processing pipeline 130-*x* and executes the program segment X1 to process the second packet Px2. While the first processor core 120-*x*-1 of the data processing pipeline 130-*x* processes the second packet Px2, the second processor core 120-*x*-2 of the data processing pipeline 130-*x* executes program segment X2 on the first packet Px1. This cascaded processing on the first packet Px1 continues until the M-th processor core 120-*x*-M of the data processing pipeline 130-*x* executes program segment XM on the first packet Px1. So, more generally, it will be appreciated that when the M-th processor core 120-*x*-M of the data processing pipeline 130-*x* is executing the program segment XM, the first processor core 120-*x*-1 of the data processing pipeline 130-*x* may be executing the program segment X1 on the (M−1)-th packet (which may be denoted as packet Px(M−1)). In an NPU, each data processing pipeline 130 could be an ingress pipeline to process incoming packets or an egress pipeline to process outgoing packets. In the case of the ingress pipeline, the input packet queue for a data processing pipeline 130 includes the packets received from network ports, and a packet from the output of an ingress pipeline is further sent to an egress pipeline for egress processing or is sent to a CPU if the packet is to be consumed locally by the routing system (such as control protocol packets or the like). In the case of an egress pipeline, the input packet queue for a data processing pipeline 130 includes packets to be sent out of network ports after the egress processing. Since the parallel processing by the data processing pipelines 130 has reordered the incoming packets (before the packets were picked up by the scatterer 110), there may be a need to reorder the packets back into the incoming order and this reordering, when needed, is performed by the gatherer 140 which gathers the packets out of the data processing pipelines 130 and reorders them to the correct order (e.g., based on addition of sequence numbers to the packets by the scatterer 110 for use by the gatherer 140 for reordering).

The processing unit 100 is configured to support a processing unit fault detection capability, for detecting faults associated with processor cores 120, based on monitoring of the processor cores 120 via propagation of heartbeat messages via the data processing pipelines 130. The monitoring of the processor cores 120 for detecting faults associated with processor cores 120 is discussed further below.

The processing unit 100 is configured to support monitoring of the processor cores 120 based on organization of the processor cores 120 into the data processing pipelines 130 and monitoring of the data processing pipelines 130 based on propagation of heartbeat messages via the data processing pipelines 130. In this manner, the data processing pipelines 130 may be monitored in parallel, with each of the data processing pipelines 130 monitored independently of each of the other data processing pipelines 130. For monitoring of a given data processing pipeline 130: (1) the PME 121 of the head processor core 120 of the data processing pipeline 130 periodically generates heartbeat messages and sends the heartbeat messages toward the tail processor core 120, (2) the PMEs 121 of the intermediate processor cores 120 of the data processing pipeline 130 receive, recognize, and forward heartbeat messages along the data processing pipeline 130, and (3) the PME 121 of the tail processor core 120 of the data processing pipeline 130 monitors for receipt of heartbeat messages and determines the health of the data processing pipeline 130 based on whether the heartbeat messages are received at the tail processor core 120 of the data processing pipeline 130. If the processor cores 120 of the data processing pipeline 130 are operating properly, then the heartbeat message injected by the head processor core 120 will be propagated along the data processing pipeline 130 from processor core 120 to processor core 120 until being received by the tail processor core 120 of the data processing pipeline 130. As long as a heartbeat message is received by the PME 121 of the tail processor core 120 within a threshold length of time, each of the processor cores 120 of the data processing pipeline 130 is considered to be healthy and, thus, no fault is detected for any of the processor cores 120 of the data processing pipeline 130. By contrast, if a threshold length of time passes without a heartbeat message being receive by the tail processor core 120 of the data processing pipeline 130, this is an indication of a fault somewhere in the data processing pipeline 130 (e.g., one or more faults experienced by one or more of the processor cores 120 of the data processing pipeline 130) and, in response, the tail processor core 120 of the data processing pipeline 130 sends a fault detection notification for the data processing pipeline 130 to the centralized management entity 150 via the associated pipeline failure reporting channel 151 for the data processing pipeline 130. The propagation of the heartbeat messages is illustrated as heartbeat messages 131 (e.g., including a first set of heartbeat messages 131-1 being propagated via the data processing pipeline 130-1, a second set of heartbeat messages 131-2 being propagated via the data processing pipeline 130-2, and so forth, with an N-th set of heartbeat messages 131-N being propagated via the data processing pipeline 130-N).

The processing unit 100 is configured to support monitoring of the processor cores 120 based on propagation of heartbeat messages via the data processing pipelines 130. The heartbeat messages may be formatted in a manner enabling the processor cores 120 of the data processing pipelines 130 to recognize the heartbeat messages for proper handling of the heartbeat messages to support monitoring of the processor cores 120 of the data processing pipelines 130. It will be appreciated that the manner in which the heartbeat messages are formatted may depend on various factors, such as the processing unit type of the processing unit 100 (e.g., CPU, GPU, NPU, or the like), whether or not the heartbeat messages are propagated in-band along with data messages such that the heartbeat messages need to be distinguished from the data messages, formats of the data messages where the heartbeat messages are propagated in-band along with data messages such that the heartbeat messages need to be distinguished from the data messages, or the like, as well as various combinations thereof. For example, for a CPU or a GPU which also uses the data processing pipelines 130 for processing data messages, the heartbeat messages may be distinguished from the regular data messages using a particular value or set of values within the headers of the heartbeat messages. For example, for an NPU which also uses the data processing pipelines for processing packets, the heartbeat messages may be implemented as heartbeat packets which may be distinguished from the regular data packets in various ways (e.g., using a particular communication protocol or combination of communication protocols, using one or more header fields of one or more communication protocols, using one or more values in one or more header fields of one or more protocols, or the like, as well as various combinations thereof). For example, for an NPU processing Ethernet frames along the data processing pipelines 130, the heartbeat messages may be distinguished from the Ethernet frames being processed by configuring each heartbeat message as a special Ethernet frame that includes only the source and destination media access control (MAC) address fields and the Ethernet Type field (which is commonly referred to as the Ethernet Type/Length field since it may be used to encode type or length information), with each of the three fields being encoded as all zeros. For example, for an NPU processing IP packets along the data processing pipelines 130, the heartbeat messages may be distinguished from the IP packets being processed by configuring each heartbeat message to use a special value or set of values in the IP header. It will be appreciated that at least some such example embodiments are presented with respect to FIG. 2. It will be appreciated that the heartbeat messages may be formatted in various other ways to support identification of the heartbeat messages by the processor cores 120 of the data processing pipelines 130 and, thus to support monitoring of the processor cores 120 of the data processing pipelines 130 based on propagation of heartbeat messages via the data processing pipelines 130.

The centralized monitoring entity 150 is configured to receive fault notification messages from the data processing pipelines 130 (illustratively, from the PMEs 121-$x$-M of the tail processor cores 120-$x$-M of the data processing pipelines 130-1 to 130-N, respectively) via the associated pipeline failure reporting channels 151 for the data processing pipelines 130. The centralized monitoring entity 150 may be configured to, based on receipt of a fault notification message indicative of a fault associated with one of the data processing pipelines 130, initiate one or more management actions for the one of the data processing pipelines 130 for which the fault was reported. For example, the centralized monitoring entity 150, in response to an indication of a fault associated with one of the data processing pipelines 130, may initiate one or more notification messages to one or more other entities (e.g., one or more other entities within the processing unit 100, one or more entities outside of the processing unit 100, or the like), deactivate the data processing pipeline (e.g., take the data processing pipeline offline, power down the data processing pipeline, or the like), initiate diversion of data away from the data processing pipeline, activate one or more data processing pipelines to replace the data processing capacity lost due to the fault in the data processing pipeline, initiate one or more analysis functions for determining which processor core (or cores) of the data processing pipeline is experiencing a fault (e.g., sending messages to each of the processor cores of the data processing pipeline to determine which of the processor cores is able to respond), initiate one or more remediation functions for resolving any faults associated with any processor cores of the data processing pipeline, or the like, as well as various combinations thereof. It will be appreciated that the centralized monitoring entity 150 may be configured to initiate various other management actions in response to receipt of a fault notification message indicative of a fault associated with one of the data processing pipelines 130. It will be appreciated that the centralized monitoring entity 150 may be configured to support various other functions for supporting monitoring of the data processing pipelines 130 based on propagation of heartbeat messages via the data processing pipelines 130.

It will be appreciated that, although primarily presented with respect to example embodiments in which the heartbeat messages are propagated via the data processing pipelines 130 in a direction that is the same as the direction of propagation of data via the data processing pipelines 130 for processing by the processor cores 120 of the data processing pipelines 130, in at least some example embodiments the heartbeat messages may be propagated via the data processing pipelines 130 in a direction that is opposite to the direction of propagation of data via the data processing pipelines 130 for processing by the processor cores 120 of the data processing pipelines 130. For example, in the data processing pipeline 130-1, the PME 121-1-M of processor core 120-1-M may inject heartbeat messages and the PME 121-1-1 of the processor core 120-1-1 may monitor for receipt of the heartbeat messages, the PME 121-2-M of processor core 120-2-M may inject heartbeat messages and the PME 121-2-1 of the processor core 120-2-1 may monitor for receipt of the heartbeat messages, and so forth, with the PME 121-N-M of processor core 120-N-M may inject heartbeat messages and the PME 121-N-1 of the processor core 120-N-1 may monitor for receipt of the heartbeat messages. It will be appreciated that different ones of the data processing pipelines 130 may use different directions of transmission for the heartbeat messages, such that a combination of such implementations may be supported within the processing unit 100.

It will be appreciated that, although primarily presented with respect to example embodiments in which the heartbeat messages are propagated via the data processing pipelines 130 in parallel with propagation of data via the data processing pipelines 130 for processing by the processor cores 120 of the data processing pipelines 130, in at least some example embodiments the processor cores 120 may be arranged to form the data processing pipelines 130 solely for the purpose of propagating heartbeat messages via the data processing pipelines 130 for monitoring the health of the processor cores 120 of the data processing pipelines 130. For example, where the processor cores 120 are used for processing data, but the processor cores 120 are not organized into the data processing pipelines 130 for purposes of performing that data processing, the processor cores 120 are organized into the data processing pipelines 130 for the purpose of supporting monitoring of the processor cores 120 based on propagation of heartbeat messages via the data processing pipelines 130.

It will be appreciated that the monitoring of the health of the processor cores 120 of the processing unit 100 based on the monitoring of the data processing pipelines 130 based on the heartbeat messages obviates the need for the centralized monitoring entity 150 to monitor each of the processor cores 120 individually using dedicated monitoring buses between the centralized monitoring entity 150 and each of the processor cores 120, thereby simplifying various aspects of monitoring of the health of the processor cores 120 of the processing unit 100. It will be appreciated, however, that the centralized management entity 150 still may perform direct monitoring of one or more of the processor cores 120 for various purposes (e.g., performing direct monitoring of some or all of the processor cores 120 of a particular one of the data processing pipelines 130 based on detection of a fault associated with the one of the data processing pipelines 130, performing direct monitoring of some or all of the processor cores 120 of a particular one of the data processing pipelines 130 based on an indication of a condition associated with the one of the data processing pipelines 130, performing direct monitoring of the processor cores 120 of the data processing pipelines 130 that are responsible for heartbeat message generation (the head processor cores 120 for the heartbeat message direction) since the generation of the heartbeat messages is a relatively important function for supporting monitoring of the data processing pipelines 130 based on heartbeat messages, performing direct monitoring of the processor cores 120 of the data processing pipelines 130 that are responsible for heartbeat message detection (the tail processor cores 120 for the heartbeat message direction) since the detection of the heartbeat messages is a relatively important function for supporting monitoring of the data processing pipelines 130 based on heartbeat messages, or the like, as well as various combinations thereof).

It will be appreciated that the monitoring of the health of the processor cores 120, based on the monitoring of the data processing pipelines 130 using heartbeat messages injected, propagated, and detected by the PMEs 121 of the processor cores 120 of the data processing pipelines 130, may be performed in various other ways.

The monitoring of the health of the processor cores 120 of the processing unit 100 based on the monitoring of the data processing pipelines 130 based on heartbeat messages may be further understood by considering various aspects of processor cores and data processing where the processing unit 100 is implemented as an NPU and, within this NPU context, comparing use of direct processor core monitoring techniques for monitoring the health of the processor cores of the NPU with use of the processing unit fault detection capability for monitoring the health of the processor cores of the NPU based on heartbeat messages propagated via data processing pipelines including the processor cores. An NPU generally includes a very large number of processor cores, and the number of processor cores included in NPUs continues to grow. Since the processor core of an NPU executes instructions of a program segment, the processor core may be susceptible to various faults/exceptions, just like a general-purpose processor. For example, a few examples of faults include: (1) a processor core can lock up (e.g., the execution stalls), (2) a processor core can read faulty memory, resulting in a crash of the program, or (3) a processor core can crash due to various internal reasons. When a processor core encounters such a fatal fault, the entire data processing pipeline to which the processor core belongs stops. Upon detection of the failure of one or more processor cores, the NPU needs to either shutdown the data processing pipeline or declare a failure of the entire NPU (e.g., so that a backup NPU or a mate NPU in a cluster of NPUs can assume ownership of the ports of the failed NPU).

As indicated above with respect to consideration of the NPU context, direct processor core monitoring techniques may be used for monitoring the health of the processor cores of an NPU. A centralized monitoring entity (CME) may be deployed on the NPU to periodically poll each of the processor cores in the NPU, through a broadcast bus connecting the CME to each of the processor cores in the NPU, such that the CME can determine which processor cores are alive based on receipt of responses to the polls from the processor cores. However, in order to reduce or minimize packet loss in an NPU, the failure detection and corrective action generally needs to happen on the order of less than 1 millisecond. That means failure detection should happen at least in less than 500 microseconds. For example, this stringent timing guarantee may be required for various types of traffic traversing the NPU, such as for real-time autonomous vehicle control application, real-time financial monitoring/trading applications, real-time supercomputing applications, or various other types of applications where packet loss is not tolerable. When an NPU includes a very large number of cores (e.g., 32,000, 64000, 128,000, or the like), efficiency of the per-core direct fault monitoring polling techniques discussed above suffers linearly with the number of cores included within the NPU as the CME needs to poll each core periodically. For example, in NPUs with 8,000 processor cores, CMEs employing the per-core direct fault monitoring polling techniques discussed above may take around 1-3.5 seconds to detect failure of one of the processor cores. Additionally, the periodic polling of a large number of processor cores is also inefficient from a power consumption point of view.

As indicated above with respect to consideration of the NPU context, where processing unit 100 is operating as an NPU, the monitoring of the health of the processor cores 120 of the processing unit 100 based on the monitoring of the data processing pipelines 130 based on heartbeat messages may be performed as follows. For such an NPU, assume that the processor cores are organized into data processing pipelines, where each data processing pipeline has a head processor core and a tail processor core with the head processor core being the entry point of packets into the data processing pipeline and the tail processor core being the exit point of packets out of the data processing pipeline. The head processor core of a data processing pipeline periodically injects a "pipeline heartbeat" packet into the data processing pipeline, along the same path used by the regular data packets. The pipeline heartbeat packet bears a special signature that distinguishes it from the data packets processed by the data processing pipeline. Each subsequent processor core in the data processing pipeline simply forwards the pipeline heartbeat packet to the adjacent downstream processor core in the data processing pipeline. When the pipeline heartbeat packet arrives at the tail processor core, the tail processor core extracts and drops the pipeline heartbeat packet. The receipt of a pipeline heartbeat packet by the tail processor core is an indicator that all of the processor cores along the data processing pipeline are capable of forwarding packets (since they successfully forwarded the pipeline heartbeat packet) and, thus, are healthy. If tail processor core of the data processing pipeline does not receive the periodic pipeline heartbeat packet for a predefined timeout interval (e.g., a heartbeat generation period for generation of the pipeline heartbeat packet plus some additional buffer time for propagation delay along the data processing pipeline for the pipeline heartbeat packet to traverse from the head processor core to the tail processor core) then the tail processor core reports failure of the data processing pipeline to the CME. It is noted that, here, the tail processor core may include a pipeline monitoring entity (PME) and (may itself be considered to be a PME for the data processing pipeline). The PME within the tail processor core of a data processing pipeline, upon detecting a fault in the data processing pipeline (e.g., a pipeline heartbeat packet is not received before expiration of a timer), can interrupt the CME on the fault. It is noted that use of monitoring of the processor cores based on monitoring of the packet processing pipelines using pipeline heartbeat packets obviates the need for use of the per-core direct fault monitoring polling techniques discussed above in order to monitor the processor cores of the NPU and, further, that the efficiency of the monitoring of the processor cores based on monitoring of the packet processing pipelines using pipeline heartbeat packets is independent of the number of processor cores employed by the NPU. It is noted that, since the pipeline heartbeat packets are sent along the packet forwarding path of the data processing pipeline, the period of transmission of the pipeline heartbeat packets could be as low as 1 microsecond (or even lower, depending on clock speed of the processor cores). In this manner, the monitoring of the health of the processor cores 120 of the processing unit 100 based on the monitoring of the data processing pipelines 130 based on heartbeat messages provides a high-performance and energy-efficient mechanism to detect processor core faults at a stringent time granularity, such as in 500 microseconds or less (e.g., at least 2000 times more efficiently than the per-core direct fault monitoring polling techniques discussed above).

It will be appreciated that the processing unit 100 may be configured to support the processing unit fault detection capability, for detecting faults associated with processor cores 120 based on monitoring of the processor cores 120 via propagation of heartbeat messages via the data processing pipelines 130, in various other ways.

Figure 2:
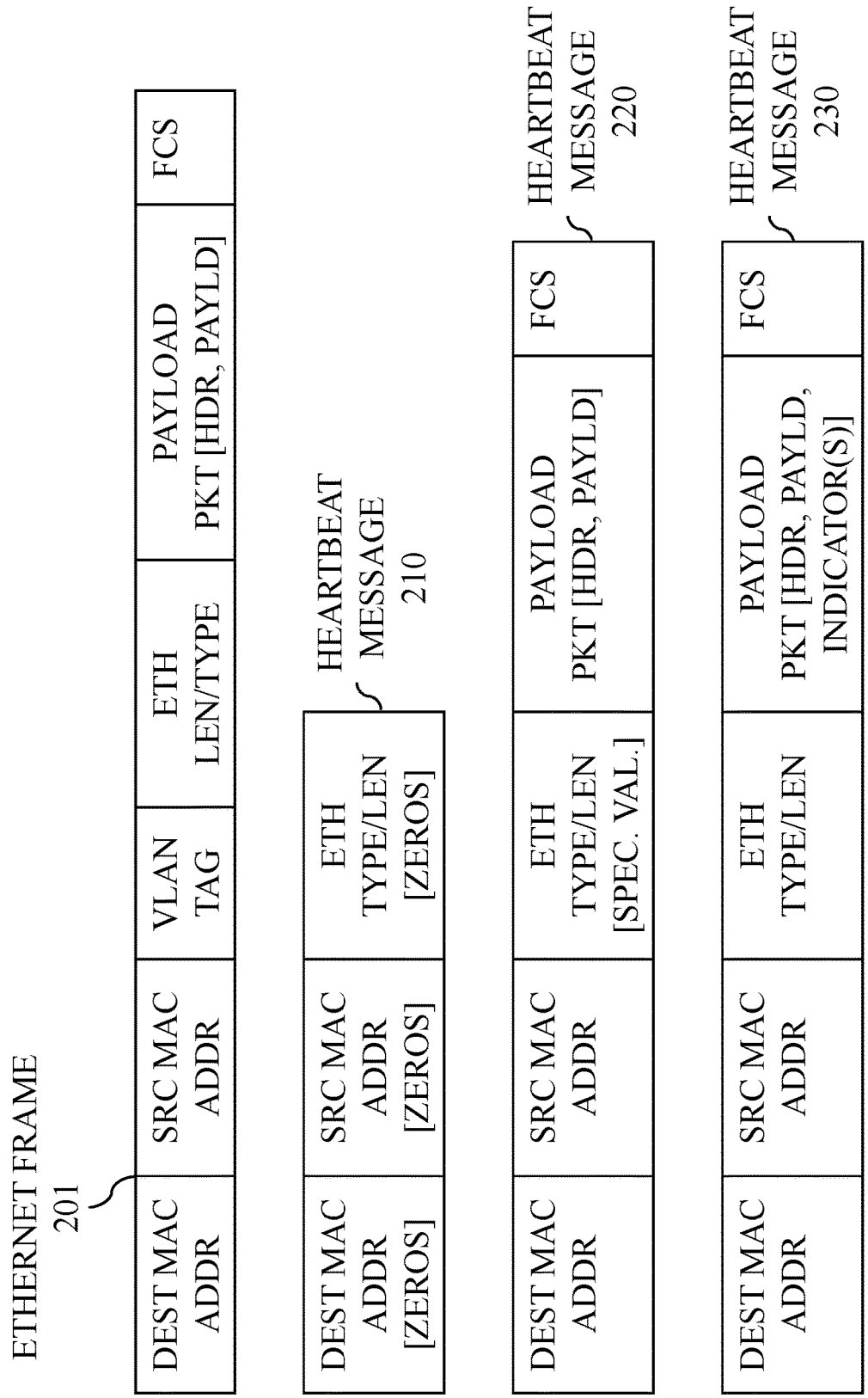
FIG. 2 depicts an example embodiment of modification of an Ethernet frame for use as a heartbeat message for core processor fault detection in a network processing unit.

FIG. 2 depicts an example embodiment of modification of an Ethernet frame for use as a heartbeat message for core processor fault detection in a network processing unit.

In an NPU, since the pipeline heartbeat packets may be sent along the same path as the regular data packets, each pipeline heartbeat packet may be encoded as a standard data packet but bearing a signature to distinguish the pipeline heartbeat packet from the regular data packets. Ethernet is the standard data link layer protocol used extensively in networking and, as a result, Ethernet packet processing and forwarding is a fundamental feature of many NPUs. In such cases, the heartbeat messages may be implemented as special Ethernet frames configured to be detected and distinguished from the regular Ethernet frames being processed by the NPU.

As illustrated in FIG. 2, an Ethernet frame 201 includes a destination MAC address (DMAC) field (including the 6-byte MAC address of the destination node for the Ethernet frame), a source MAC address (SMAC) field (including the 6-byte MAC address of the originating node of the Ethernet frame, a virtual local area network (VLAN) tag field (although one is illustrated, zero or more may be included), an Ethernet Type/Length field (e.g., the Ethernet Type (EtherType) field, which is a 2-byte field that indicates either the upper layer protocol header type carried in the payload (i.e., the Type) or the length of the payload (i.e., the Length)), a payload, and a Frame Check Sequence (FCS) field (which includes an FCS for detection of errors in the received Ethernet frame). The payload can include a network layer protocol packet (e.g., IPv4, IPv6, or the like), a data link layer control protocol packet (e.g., any variant of spanning tree protocols, a packet of an Intermediate-System-to-Intermediate-System (IS-IS) routing protocol, an Ethernet OAM packet, or the like), or the like. The Ethernet frame 201 may be used as a basis for defining a special Ethernet frame to be used as a heartbeat message which can be distinguished from the regular Ethernet frames. It is noted that example embodiments of three special Ethernet frames are depicted in FIG. 2.

As illustrated in FIG. 2, a heartbeat message 210 may be defined to be a special Ethernet frame that encodes only the DMAC field, the SMAC field, and the Ethernet Type/Length field. Here, the DMAC, SMAC, and Ethernet Type/Length fields may be encoded with all zeros. Here, since the Ethernet Type/Length field is encoded as zero (0), there is no payload carried by this special Ethernet frame (i.e., the Length=0). An Ethernet frame carrying a payload cannot have DMAC or SMAC field values as 0 since it is not a valid MAC address and would be dropped at the very initial stages of the pipeline. So, if this Ethernet frame is traversing along the processor cores in the data processing pipeline, it can be determined that this Ethernet frame must be a pipeline heartbeat message since no regular Ethernet frame would be permitted to propagate in this format.

As illustrated in FIG. 2, a heartbeat message 220 may be defined to be a special Ethernet frame that encodes a special Ethernet Type value defined to indicate a pipeline heartbeat message. Here, the DMAC and SMAC fields may be encoded with any suitable values and the Ethernet frame may include payload. So, this special Ethernet frame may be identified as being a pipeline heartbeat message based on the special Ethernet Type value included in the Ethernet Type/Length field as the special Ethernet frame traverses along the processor cores in the data processing pipelines.

As illustrated in FIG. 2, a heartbeat message 230 may be defined to be a special Ethernet frame that encodes one or more header fields and/or one or more values defined to indicate a pipeline heartbeat message. The one or more header fields and/or one or more values may be included within a packet that is included within the payload of the Ethernet frame. For example, one or more header fields of the packet included within the payload of the Ethernet frame may be included to indicate that the Ethernet frame is a heartbeat message, one or more values may be encoded within the packet included within the payload of the Ethernet frame to indicate that the Ethernet frame is a heartbeat message, or the like, as well as various combinations thereof. So, this special Ethernet frame may be identified as being a pipeline heartbeat message based on the formatting of the underlying packet transported within the Ethernet frame as the Ethernet frame traverses along the processor cores in the data processing pipelines.

It will be appreciated that, although primarily presented with respect to use of Ethernet as a basis for definition of heartbeat messages which may be detected by processor cores of data processing pipelines, heartbeat messages may be defined based on various other protocols (e.g., based on Internet Protocol (e.g., IPv4 or IPv6), Multiprotocol Label Switching (MPLS), Bit Index Explicit Replication (BIER), or the like, as well as various combinations thereof) for enabling detection of heartbeat messages by processor cores of data processing pipelines.

It will be appreciated that, although primarily presented with respect to use of various communication protocols to define heartbeat messages, heartbeat messages may be defined or configured in various other ways to enable detection of heartbeat messages by processor cores of data processing pipelines.

Figure 3:
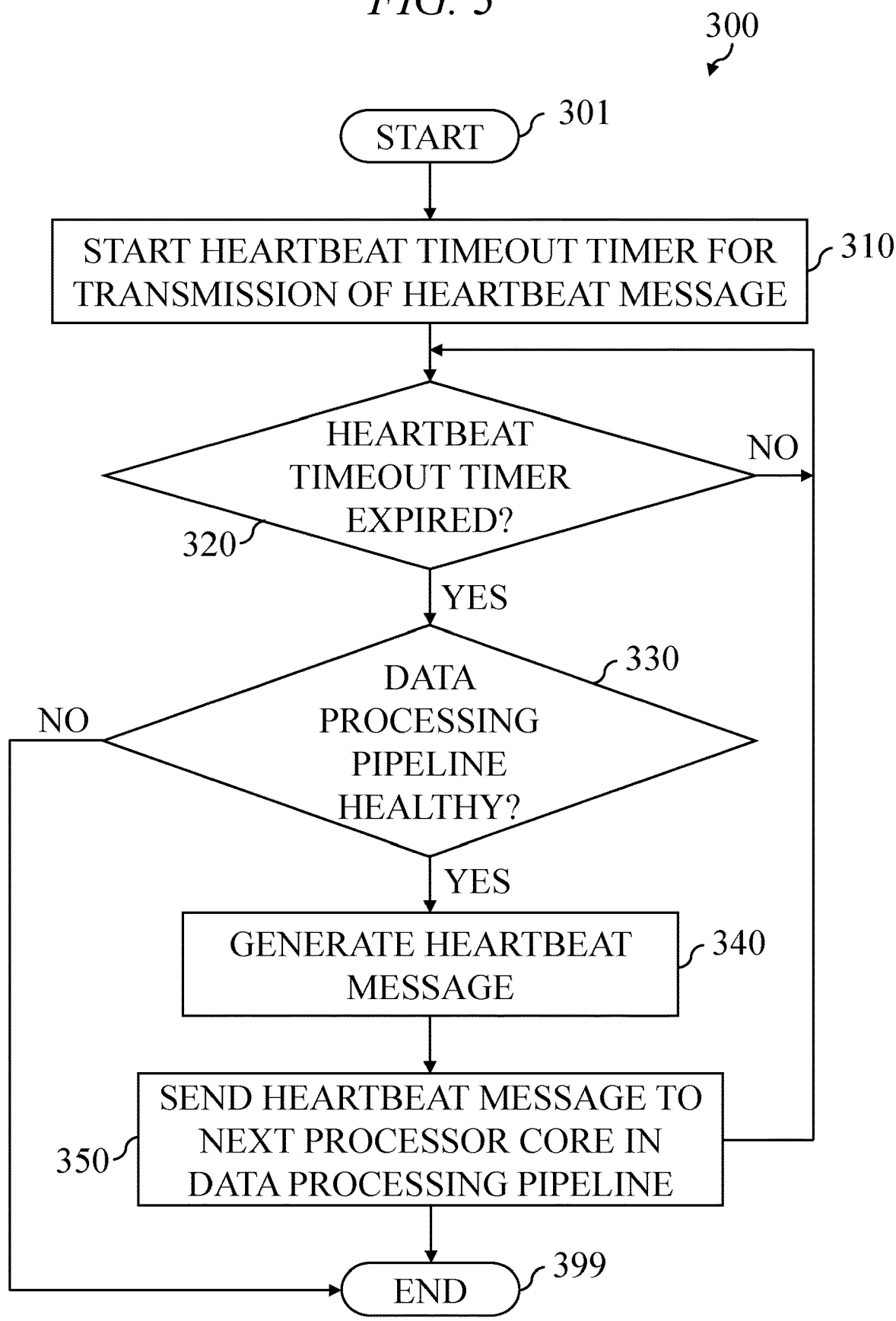
FIG. 3 depicts an example embodiment of a method for periodic injection of heartbeat messages at a head processor core of a data processing pipeline.

FIG. 3 depicts an example embodiment of a method for periodic injection of heartbeat messages at a head processor core of a data processing pipeline. It will be appreciated that, although primarily presented herein as being performed serially, at least a portion of the functions of method 300 may be performed contemporaneously or in a different order than as presented in FIG. 3. At block 301, the method 300 begins. At block 310, a heartbeat timeout timer is started for transmission of heartbeat messages via the data processing pipeline. At block 320, a determination is made as to whether the heartbeat timeout timer has expired. If the heartbeat timeout timer has not expired, the method 300 remains at block 320 until expiration of the heartbeat timeout timer is detected. If the heartbeat timeout time has expired, the method 300 proceeds to block 330. At block 330, a determination is made as to whether the data processing pipeline is healthy (e.g., the data processing pipeline has not already failed or been shut down). If the data processing pipeline is healthy then the method 300 proceeds to block 340, otherwise the method 300 proceeds to block 399 where the method 300 ends. At block 340, a heartbeat message is generated. At block 350, the heartbeat message is sent toward a network processor core in the data processing pipeline. From block 350, the method 300 proceeds to block 399 where the method 300 ends. At block 399, the method 300 ends.

Figure 4:
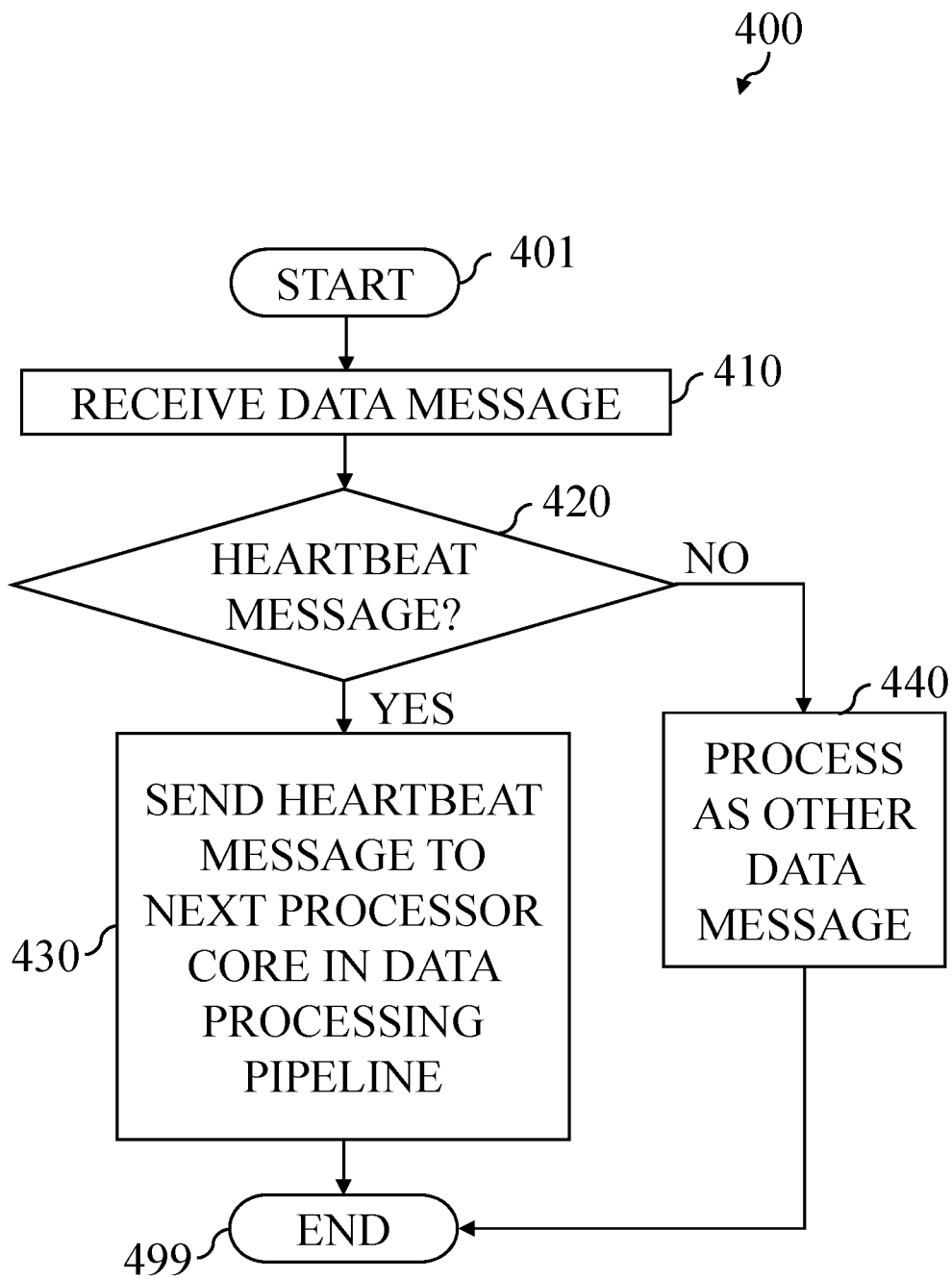
FIG. 4 depicts an example embodiment of a method for processing a heartbeat message at an intermediate processor core of a data processing pipeline.

FIG. 4 depicts an example embodiment of a method for processing a heartbeat message at an intermediate processor core of a data processing pipeline. It will be appreciated that, although primarily presented herein as being performed serially, at least a portion of the functions of method 400 may be performed contemporaneously or in a different order than as presented in FIG. 4. At block 401, the method 400 begins. At block 410, a data message is received at the intermediate processor core. The data message may be a regular data message (e.g., including data to be processed by the intermediate processor core) or a heartbeat message used for monitoring the data processing pipeline. At block 420, a determination is made as to whether the received data message is a heartbeat message. The determination as to whether the received data message is a heartbeat message may be performed in various ways depending upon the manner in which the heartbeat messages are indicated (e.g., based on the fields included, special values included in one or more fields, or the like, as well as various combinations thereof). If the data message is a heartbeat message then the method 400 proceeds to block 430 (for handling of the heartbeat message), otherwise the method 400 proceeds to block 440 for processing of the received data message as a regular data message. At block 430, the heartbeat message is sent to the next processor core in the data processing pipeline. From block 430, the method 400 proceeds to block 499, where the method 400 ends. At block 440, the received data message is processed as a regular data message (e.g., the intermediate core performs data processing functions on the received data message) as the received data message is not a heartbeat message for use in monitoring the data processing pipeline. From block 440, the method 400 proceeds to block 499, where the method 400 ends. At block 499, the method 400 ends.

Figure 5:
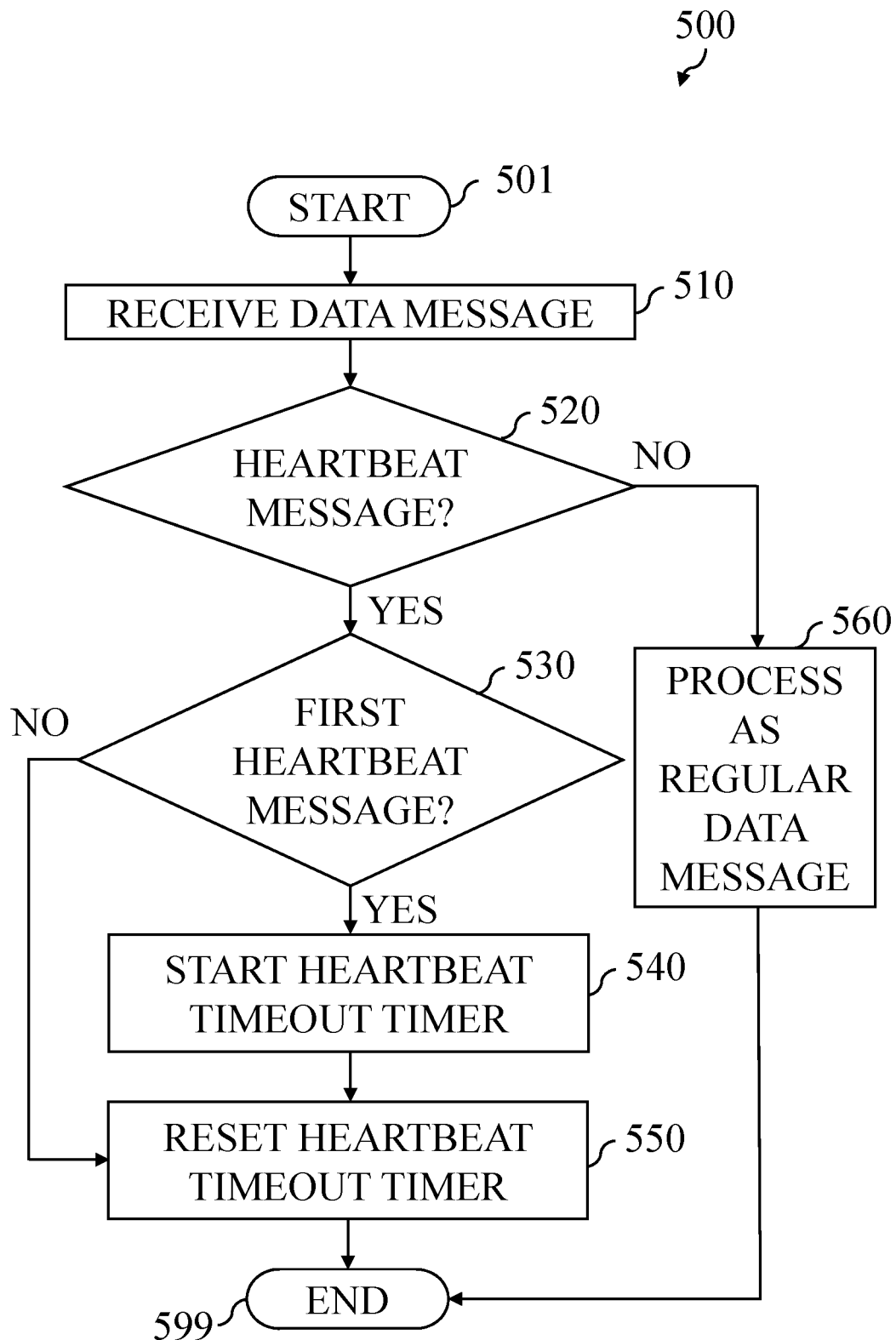
FIG. 5 depicts an example embodiment of a method for processing a heartbeat message at a tail processor core of a data processing pipeline.

FIG. 5 depicts an example embodiment of a method for processing a heartbeat message at a tail processor core of a data processing pipeline. It will be appreciated that, although primarily presented herein as being performed serially, at least a portion of the functions of method 500 may be performed contemporaneously or in a different order than as presented in FIG. 5. At block 501, the method 500 begins. At block 510, a data message is received at the tail processor core. The data message may be a regular data message (e.g., including data to be processed by the tail processor core) or a heartbeat message used for monitoring the data processing pipeline. At block 520, a determination is made as to whether the received data message is a heartbeat message. The determination as to whether the received data message is a heartbeat message may be performed in various ways depending upon the manner in which the heartbeat messages are indicated (e.g., based on one or more fields included, special values included in one or more fields, or the like, as well as various combinations thereof). If the data message is a heartbeat message then the method 500 proceeds to block 530 (for handling of the heartbeat message), otherwise the method 500 proceeds to block 560 for processing of the received data message as a regular data message. At block 530, a determination is made as to whether the heartbeat message is the first heartbeat message received at the tail processor core. If the heartbeat message is the first heartbeat message received at the tail processor core then the method 500 proceeds to block 540, otherwise the method 500 proceeds to block 550. At block 540, a heartbeat timeout timer is started for use in monitoring the data processing pipeline for a processor core fault. From block 540, the method 500 proceeds to block 550. At block 550, the heartbeat timeout timer is reset as the heartbeat message has been received within a threshold length of time such that no core fault is detected for the data processing pipeline. From block 550, the method 500 proceeds to block 599, where the method 500 ends. At block 560, the received data message is processed as a regular data message (e.g., the tail processor core performs data processing functions on the received data message) as the received data message is not a heartbeat message for use in monitoring the data processing pipeline. From block 560, the method 500 proceeds to block 599, where the method 500 ends. At block 599, the method 500 ends.

Figure 6:
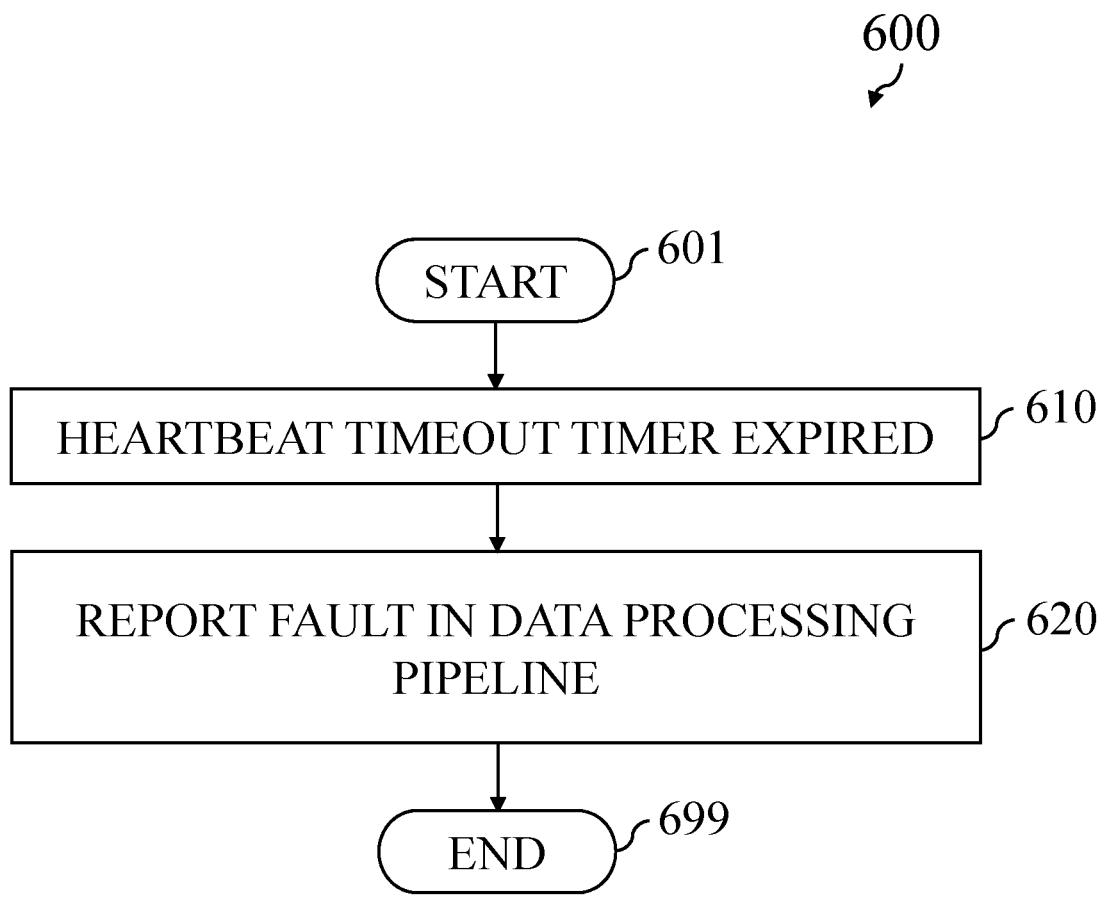
FIG. 6 depicts an example embodiment of a method for handling heartbeat timeout timer expiry at a tail processor core of a data processing pipeline.

FIG. 6 depicts an example embodiment of a method for handling heartbeat timeout timer expiry at a tail processor core of a data processing pipeline. It will be appreciated that, although primarily presented herein as being performed serially, at least a portion of the functions of method 600 may be performed contemporaneously or in a different order than as presented in FIG. 6. At block 601, the method 600 begins. At block 610, a determination is made that the heartbeat timeout timer has expired, because no heartbeat has been received within the expected interval (e.g., since the heartbeat timeout timer was last started). At block 620, a fault in the data processing pipeline is reported. The fault in the data processing pipeline may be reported to a centralized monitoring entity and/or other suitable entity. At block 699, the method 600 ends.

Figure 7:
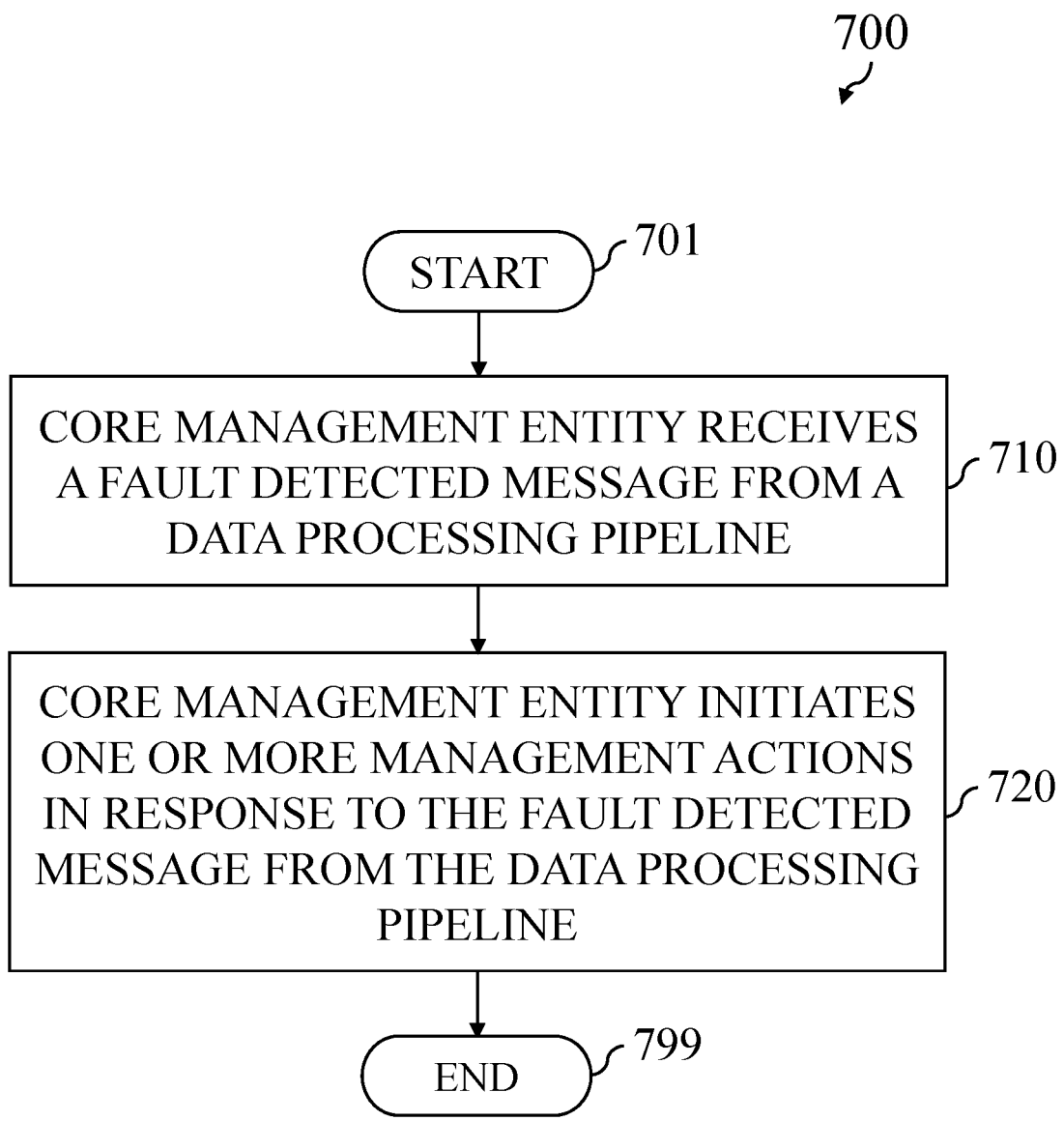
FIG. 7 depicts an example embodiment of a method for handing a processor core fault notification at a centralized monitoring entity.

FIG. 7 depicts an example embodiment of a method for handing a processor core fault notification at a centralized monitoring entity. It will be appreciated that, although primarily presented herein as being performed serially, at least a portion of the functions of method 700 may be performed contemporaneously or in a different order than as presented in FIG. 7. At block 701, the method 700 begins. At block 710, the centralized monitoring entity receives a fault detected message from a data processing pipeline (e.g., from a tail processor core of the data processing pipeline based on a determination that the heartbeat timeout timer has expired without receipt of a heartbeat message at the tail processor core of the data processing pipeline). At block 720, the centralized monitoring entity initiates one or more management actions in response to the fault detected message from the data processing pipeline. The one or more management actions may include initiating one or more notification messages to one or more other entities, deactivating the data processing pipeline, initiating diversion of data away from the data processing pipeline, activating one or more data processing pipelines to replace the data processing capacity lost due to the fault in the data processing pipeline, initiating one or more analysis functions for determining which processor core (or cores) of the data processing pipeline is experiencing a fault, initiating one or more remediation functions for resolving any faults associated with any processor cores of the data processing pipeline, or the like, as well as various combinations thereof. At block 799, the method 700 ends.

Figure 8:
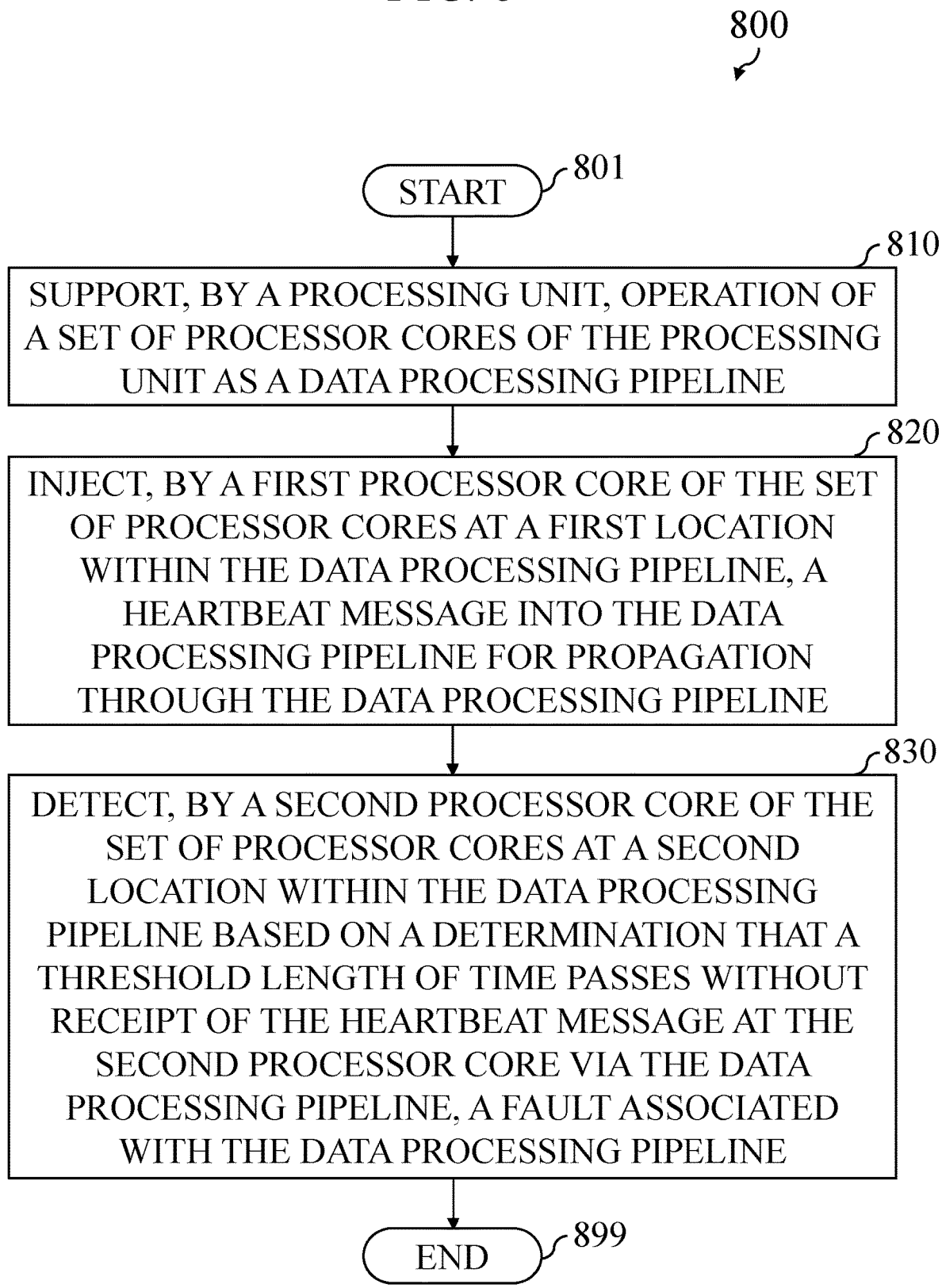
FIG. 8 depicts an example embodiment of a method for use by a processing unit to support fault detection for the processor cores of the processing unit.

FIG. 8 depicts an example embodiment of a method for use by a processing unit to support fault detection for the processor cores of the processing unit. It will be appreciated that, although primarily presented herein as being performed serially, at least a portion of the functions of method 800 may be performed contemporaneously or in a different order than as presented in FIG. 8. At block 801, the method 800 begins. At block 810, support, by a processing unit, operation of a set of processor cores of the processing unit as a data processing pipeline. At block 820, inject, by a first processor core of the set of processor cores at a first location within the data processing pipeline, a heartbeat message into the data processing pipeline for propagation through the data processing pipeline. At block 830, detect, by a second processor core of the set of processor cores at a second location within the data processing pipeline based on a determination that a threshold length of time passes without receipt of the heartbeat message at the second processor core via the data processing pipeline, a fault associated with the data processing pipeline. At block 899, the method 800 ends.

Figure 9:
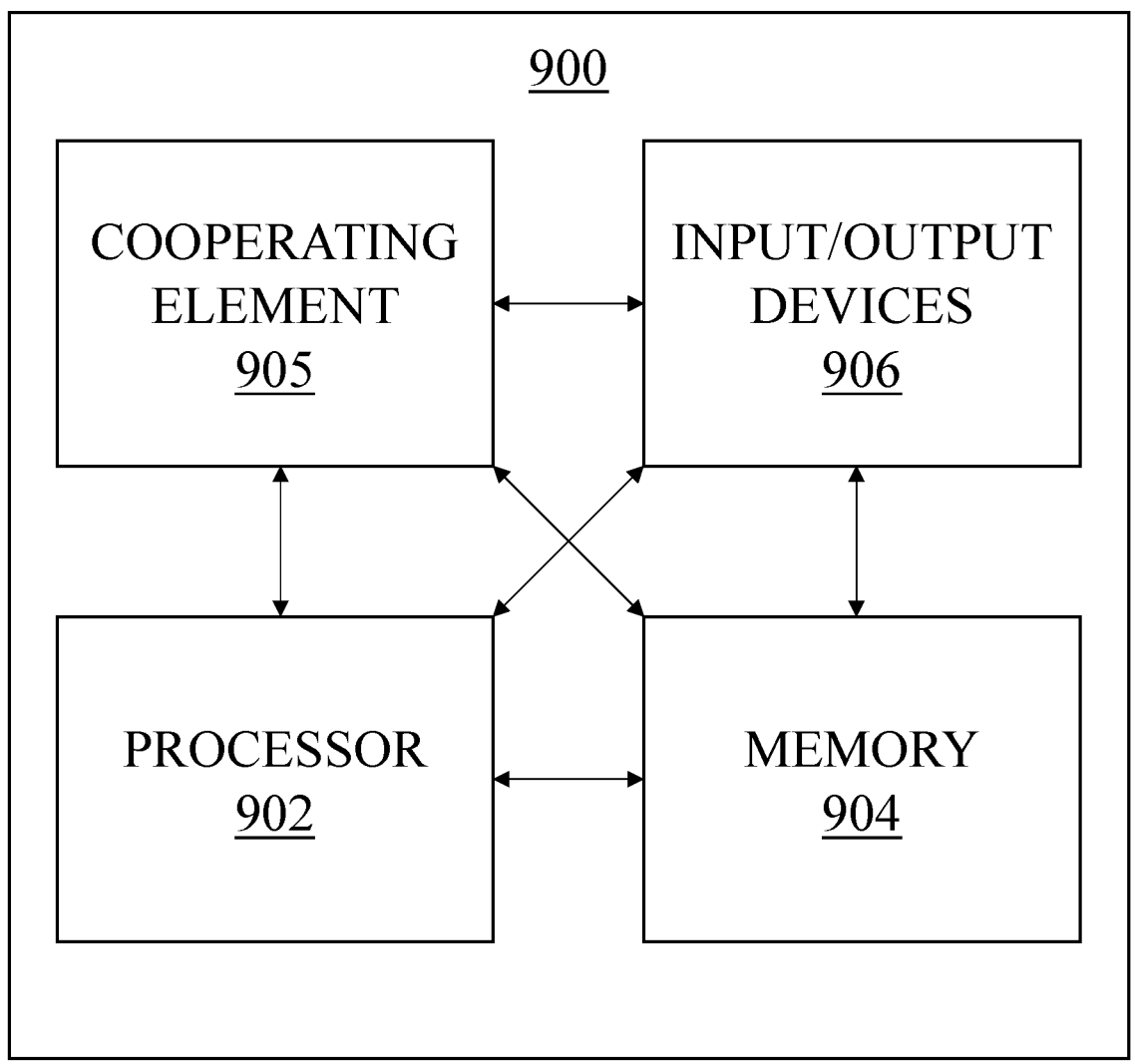
FIG. 9 depicts an example embodiment of a computer suitable for use in performing various functions presented herein.

FIG. 9 depicts an example embodiment of a computer suitable for use in performing various functions presented herein.

The computer 900 includes a processor 902 (e.g., a processing unit such as a CPU(s), a GPU(s), an NPU(s), or the like) and a memory 904 (e.g., a random access memory (RAM), a read-only memory (ROM), or the like). In at least some example embodiments, the computer 900 may include at least one processor and at least one memory storing instructions that, when executed by the at least one processor, cause the computer to perform various functions presented herein.

The computer 900 also may include a cooperating element 905. The cooperating element 905 may include hardware or a hardware device. The cooperating element 905 may include firmware. The cooperating element 905 may include software, such as a process that can be loaded into the memory 904 and executed by the processor 902 to implement various functions presented herein (in which case, for example, the cooperating element 905 (including associated data structures) can be stored on a non-transitory computer readable medium, such as a storage device or other suitable type of storage element (e.g., a magnetic drive, an optical drive, or the like)).

The computer 900 also may include one or more input/output devices 906. The input/output devices 906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 900 may represent a general architecture and functionality suitable for implementing functional elements described herein, portions of functional elements described herein, or the like, as well as various combinations thereof. For example, computer 900 may provide a general architecture and functionality that is suitable for implementing utilizing a processing unit as presented herein, a portion of a processing unit as presented herein (e.g., a processor core, a core management entity, or the like), or the like as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processing unit including a set of processor cores, wherein the processing unit is configured to support arrangement of at least a portion of the processor cores into a data processing pipeline;
wherein a first processor core of the set of processor cores, at a first location within the data processing pipeline, is configured to inject a heartbeat message into the data processing pipeline for propagation through the data processing pipeline;
wherein a second processor core of the set of processor cores, at a second location within the data processing pipeline, is configured to detect a fault associated with the data processing pipeline based on a determination that a threshold length of time passes without receipt of the heartbeat message at the second processor core via the data processing pipeline.

2. The apparatus of claim 1, wherein the first processor core is configured to, based on a process configured to support periodic injection of heartbeat messages into the data processing pipeline, inject the heartbeat message into the data processing pipeline.

3. The apparatus of claim 1, wherein the second processor core is configured to, based on the detection of the fault associated with the data processing pipeline, send a fault message toward a management entity of the processing unit.

4. The apparatus of claim 1, wherein the first location is a first endpoint of the data processing pipeline, wherein the second location is a second endpoint of the data processing pipeline.

5. The apparatus of claim 1, wherein the data processing pipeline is configured to support processing of data messages traversing the data processing pipeline.

6. The apparatus of claim 5, wherein the heartbeat message is configured to be distinguished from the data messages.

7. The apparatus of claim 5, wherein the data messages enter the data processing pipeline at the first processor core and exit the data processing pipeline at the second processor core.

8. The apparatus of claim 5, wherein the data messages enter the data processing pipeline at the second processor core and exit the data processing pipeline at the first processor core.

9. The apparatus of claim 1, wherein the data processing pipeline is configured to support processing of data packets traversing the data processing pipeline, wherein the heartbeat message is encoded as a data packet including a signature configured to enable the heartbeat message to be distinguished from the data packets traversing the data processing pipeline.

10. The apparatus of claim 1, wherein the heartbeat message is based on a communication protocol, wherein at least one field in a communication protocol header of the communication protocol is set in a manner to indicate the heartbeat message.

11. The apparatus of claim 1, wherein the heartbeat message comprises at least one of an ethernet frame, a multiprotocol label switching packet, an internet protocol packet, or a bit index explicit replication packet.

12. The apparatus of claim 1, wherein the heartbeat message comprises an ethernet frame, wherein the ethernet frame is marked as being the heartbeat message using at least one header field of the ethernet frame.

13. The apparatus of claim 1, wherein the heartbeat message comprises an ethernet frame, wherein the ethernet frame is marked as being the heartbeat message based on inclusion within the ethernet frame of only a destination media access control address field, a source media access control address field, and an ethernet type/length field.

14. The apparatus of claim 13, wherein each of the destination media access control address field, the source media access control address field, and the ethernet type/length field has a value of zero.

15. The apparatus of claim 1, wherein the heartbeat message comprises an ethernet frame, wherein the ethernet frame is marked as being the heartbeat message based on an ethernet type/length field including an ethernet type value defined to indicate that the ethernet frame is the heartbeat message.

16. The apparatus of claim 1, wherein the heartbeat message comprises an internet protocol packet, wherein the internet protocol packet is marked as being the heartbeat message using at least one header field of the internet protocol packet.

17. The apparatus of claim 1, wherein the processing unit is configured to propagate the heartbeat message through the data processing pipeline based on storing of the heartbeat message in a memory accessible to the processor cores of the data processing pipeline and accessing of at least a portion of the heartbeat message from the memory by the processor cores of the data processing pipeline.

18. The apparatus of claim 1, wherein the processing unit is configured to propagate the heartbeat message through the data processing pipeline based on passing of at least a portion of the heartbeat message along interconnections between adjacent ones of the processor cores of the data processing pipeline.

19. The apparatus of claim 1, wherein the processing unit further includes:
a centralized monitoring entity configured to receive a fault message from the second processor core and initiate a management function for the data processing pipeline in response to the fault message.

20. The apparatus of claim 19, wherein the management function includes at least one of shutting down the data processing pipeline or declaring a failure of the processing unit.

21. The apparatus of claim 1, wherein the processing unit comprises a central processing unit, a graphics processing unit, or a network processing unit.

22. A non-transitory computer-readable storage medium storing a set of computer program instructions which, when executed by an apparatus, cause the apparatus at least to:
support, by a processing unit, operation of a set of processor cores of the processing unit as a data processing pipeline;
inject, by a first processor core of the set of processor cores at a first location within the data processing pipeline, a heartbeat message into the data processing pipeline for propagation through the data processing pipeline; and
detect, by a second processor core of the set of processor cores at a second location within the data processing pipeline based on a determination that a threshold length of time passes without receipt of the heartbeat message at the second processor core via the data processing pipeline, a fault associated with the data processing pipeline.

23. A method, comprising:
supporting, by a processing unit, operation of a set of processor cores of the processing unit as a data processing pipeline;
injecting, by a first processor core of the set of processor cores at a first location within the data processing pipeline, a heartbeat message into the data processing pipeline for propagation through the data processing pipeline; and
detecting, by a second processor core of the set of processor cores at a second location within the data processing pipeline based on a determination that a threshold length of time passes without receipt of the heartbeat message at the second processor core via the data processing pipeline, a fault associated with the data processing pipeline.

* * * * *